United States Patent Office 3,756,990
Patented Sept. 4, 1973

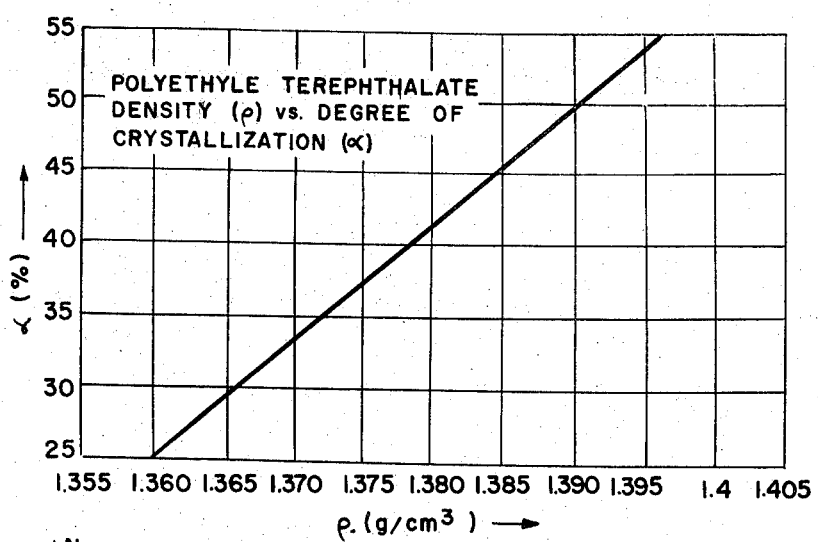
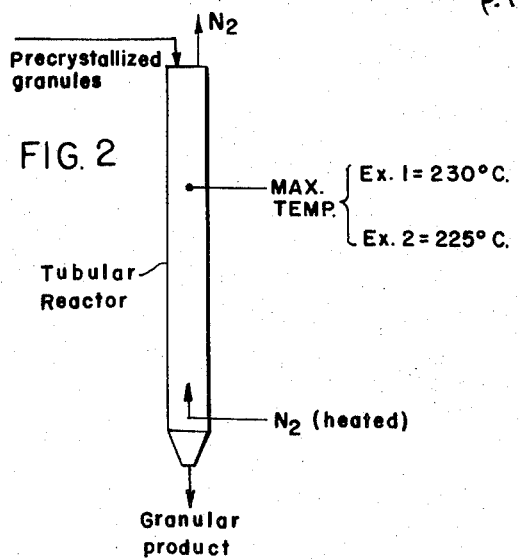
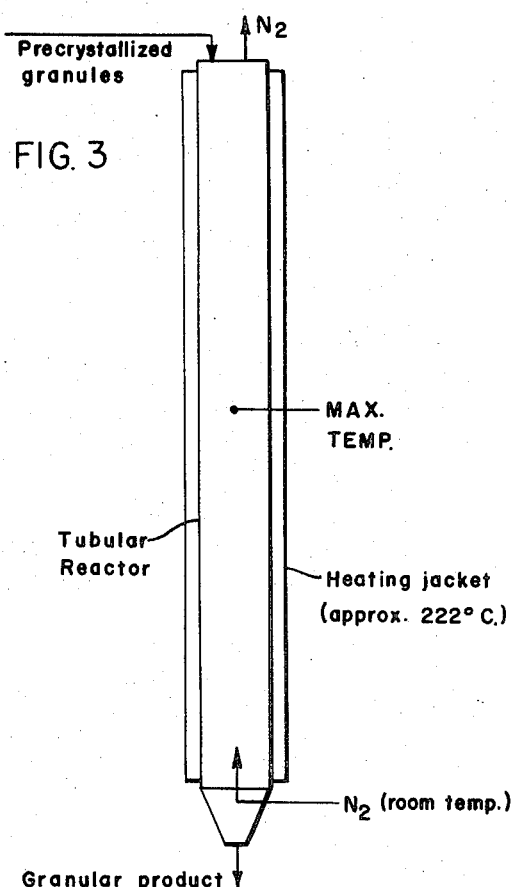

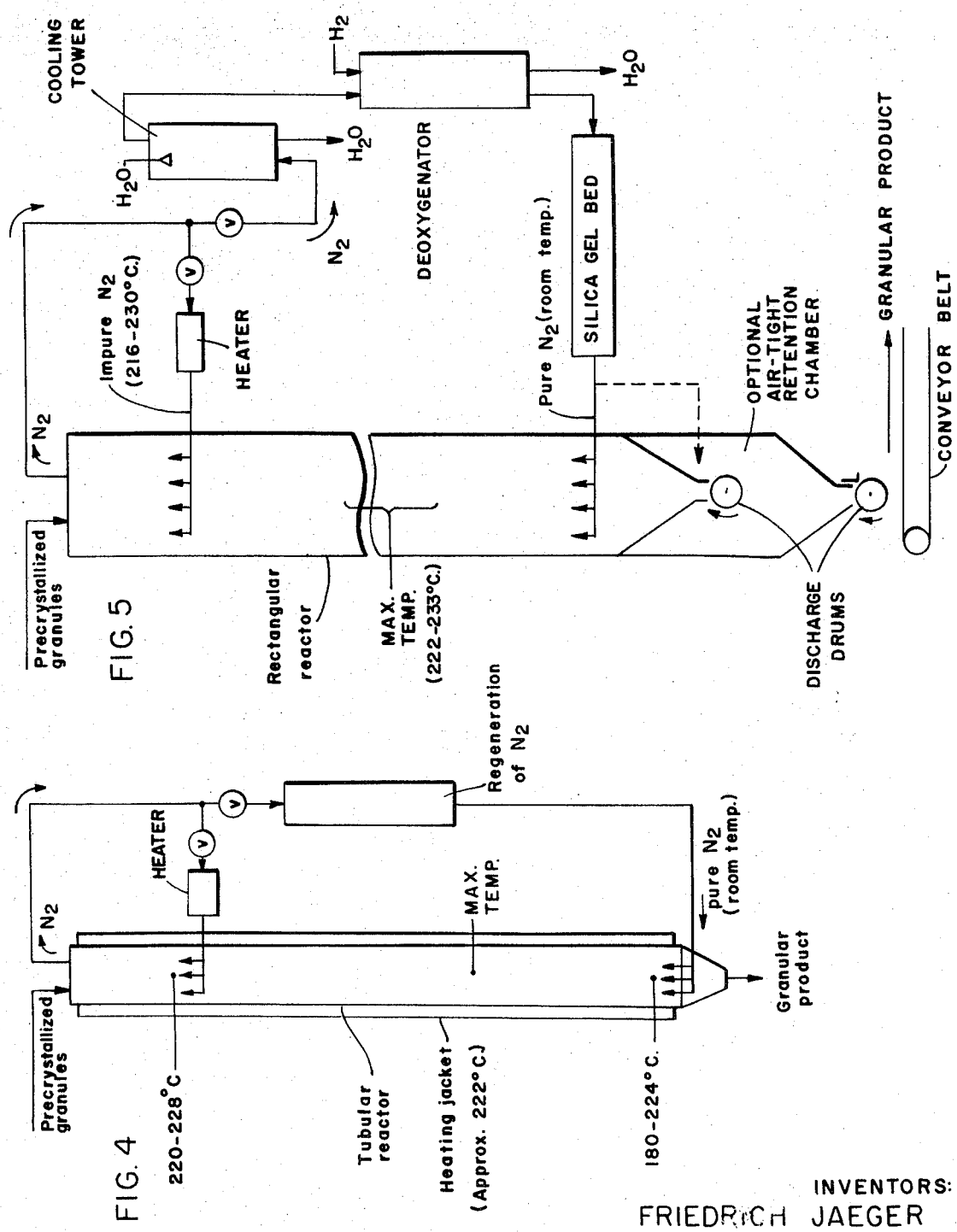

3,756,990
PROCESS FOR INCREASING THE MOLECULAR WEIGHT OF POLYETHYLENE TEREPHTHALATE
Friedrich Jaeger, Bad Hersfeld, Hans-Martin Koepp, Erlenbach, and Fritz Wiloth and Rudolf Eismann, Erlenbach am Main, Germany, assignors to Glanzstoff AG, Wuppertal, Germany
Continuation of abandoned application Ser. No. 824,637, May 14, 1969. This application Aug. 9, 1971, Ser. No. 170,281
Claims priority, application Germany, May 14, 1968, P 17 70 410.8
Int. Cl. C08g 17/003
U.S. Cl. 260—75 M        15 Claims

ABSTRACT OF THE DISCLOSURE

Process for increasing the molecular weight of polyethylene terephthalate or similar linear, fiber-forming polyesters by thermal treatment in the solid phase wherein the initial low molecular weight polyester precondensate is slowly discharged or withdrawn as a coherent granular bed or layer downwardly through a vertical heating zone in stabilized countercurrent flow to an inert gas, preferably nitrogen, while being non-isothermally heated to a maximum temperature of about 210–240° C., preferably 220–235° C. and for a period of time sufficient to cause after-condensation to a desired higher molecular weight.

This application is a continuation of copending application Ser. No. 824,637, filed May 14, 1969, now abandoned.

The present invention generally relates to a process for increasing the molecular weight of polyethylene terephthalate or similar predominately linear, fiber-forming polyesters by its thermal treatment in the solid phase as a pourable, granular material.

In referring to a "granulated polyester" or a "pourable granulate" throughout this specification, there is meant a granular material having individual particles of about the same grain size or at any rate a particle size which is as uniform as possible and, furthermore, a granular material having the properties of pourability or conveyability explained in detail in the periodical "Chemie-Ingenieur-Technik," vol. 30, 1958, No. 3, pp. 140 to 146.

Numerous processes are known in which there is carried out the increase of the molecular weight of a polyester in the solid phase. Thus, in U.S. Pats. 2,518,283, 2,534,-028 and 2,828,290, processes are described in which a solidified and pulverized or granulated prepolymer is heated for several hours under a vacuum at temperatures below the melting point. These processes are carried out in a fixed bed or so-called "static bed" and require an increased expenditure in energy and apparatus for creating a substantial vacuum. Above all, these processes cannot be continuously carried out except at an unbearable technical expenditure.

Attempts have also been made to carry out the increase of molecular weight of the polyester in a fixed bed at atmospheric pressure. Thus, in U.S. Pat. 3,075,952, there is described a process in which an inert gas is conducted over the surface of a solid mass of particles. This process is applicable only as long as the polymer layer, i.e. the fixed bed, has a depth of less than 5 mm. If the layer is thicker, then a mechanical movement and mixing of the particles among one another is required, which can be accomplished either by suitable agitators, by rotary reaction vessels or by creating turbulence in the particle mass with a rapidly introduced inert gas surrounding and moving the particles.

Similarly, in German Pat. 930,231, there is described a process in which the increase of the molecular weight of granulated polyester prepolymers, also referred to as an after-condensation, is carried out by heating the particles in a moving layer at a temperature which slowly rises but remains below the melting point of the polyester. In this case, the movement of the individual particles with respect to one another is achieved by the turbulence created by the flow of an inert gas or vapor stream (i.e. a so-called fluidized layer process) or by purely mechanical means, e.g. a rotary oven or conveyor screw.

In other known processes, the after-condensation of the granulated prepolymers is also carried out in a fluidized bed or so-called "teeter bed"; e.g. in the manner according to British Pats. 1,041,853 and 1,066,162 or according to the Dutch application 6610798.

Finally, in Pat. No. 9,346 of the (German) East-Zone Patent Office, there is described a process for the production of synthetic linear polyesters, especially polyethylene terephthalate, in which the polycondensation is accomplished entirely or in part in the solid phase at temperatures below the melting point of the polyester being produced. This process is supposed to be capable of being conducted in a continuous manner. The prepolymer converted into the solid phase is thus to be ground, conveyed through a heated system and transformed into the higher molecular weight polymer spinnable into fibers, presumably without any difficulties occurring in the drawing off of excess glycol by suction or in an adhesion of the highly viscous melt onto the walls or in the mixing of the lower molecular weight polyester with polyester that has already been converted into the higher molecular weight product. Actually, this patent fails to indicate in what manner the conveyance through a heated system, for example a pipe or similar conduit, is to take place so as to be free of such difficulties.

Of the processes previously known for increasing the molecular weight of a granulated polyester which can be conveyed in the solid phase, only those continuous processes are known in which the after-condensation or increase of molecular weight is carried out in a mechanically moved bed or a turbulent layer wherein the bed is strongly agitated by an inert gas stream, i.e. a fluidized bed.

Despite the obvious advantages of a fixed bed process without mechanical or aerodynamic turbulent movement of the granular particles among one another, there has been a preference for those processes mentioned above which use a mechanically moved or fluidized bed, perhaps due to the notion that through the continuous movement of the granular particles with respect to one another, i.e. a constant interchange of the position of the particles, the exchange of heat and material would be favored and only in this way would it be practical or feasible to achieve a rapid and, above all, a uniform heating and after-condensation of the granular polyester.

Moreover, as is shown in particular by the Dutch patent application 6610798 (laid open to public inspection), page 6, lines 20 to 27, there is a current and widely observed prejudice that, even with a violent mechanical or aerodynamic agitation of the granulate particles with respect to one another, the continuous after-condensation in the solid phase at temperatures between 225° C. and 235° C. can be controlled only with difficulty because of the danger of agglomeration of the particles and cannot be controlled at all at temperatures over 235° C. Correspondingly, the difficulties of after-condensation in an unmoved or fixed bed were considered to be much greater.

The after-condensation of a polyester prepolymer or precondensate in the fluidized bed should naturally have one advantage over the mechanically agitated layer, in that the retention time spectrum is constricted, i.e. with individual particles having about the same retention time so as to achieve a more uniform polymer product of higher molecular weight. On the other hand, however, the gas and energy consumption as well as the technical expenditure is considerably greater in the fluidized bed process than that required for a mechanically agitated bed. A further disadvantage affecting the known continuous processes in the occurrence of pulverulent or extremely fine particles arising through abrasion of the granulated polyester. These fines or powdery material contribute appreciably to the result that the tendency for adhesion or agglomeration among the particles rises severely when the mechanical or fluidized movement is reduced or abated.

In summary it can be stated that previous continuous processes employed for increasing the molecular weight of a granular polyester did not yield a technologically satisfactory solution.

One object of the present invention is to provide a continuous process for increasing the molecular weight of a granulated precondensate by thermal treatment in the solid phase, in which the abrasion is as low as possible and the retention time of the individual parties is as uniform as possible. Another object of the invention is to provide a process for the continuous thermal treatment of the polyester granulate which is considerably less expensive in terms of apparatus and energy requirements. Yet another object of the invention is to avoid agglomeration of the individual articles or their adhesion to surfaces of the apparatus during said continuous thermal treatment. These and other objects and advantages of the invention will become more apparent upon consideration of the following detailed disclosure.

It has now been found, in accordance with the invention, that such objects and advantages can be achieved in a process for the continuous thermal treatment of the polyester precondensate in the solid phase to raise its molecular weight by the steps which comprise: continuously conducting the precondensate as a pourable granular material having a substantially uniform particle size and an initial solution viscosity of about 1.4 to 2.3, preferably 1.5 to 2.0, downwardly solely by the force of gravity through an elongated vertical heating zone of uniform cross-section to form a coherent granular bed with stabilized flow and approximately uniform retention time of the individual particles in the heating zone; passing an inert gas, preferably nitrogen, upwardly in countercurrent flow through the bed of granular material (at a rate insufficient to cause fluidization of the bed) in the heating zone; and heating the granular material within the heating zone up to a maximum temperature of about 210° C. to 240° C., preferably 220° C. to 235° C., and for a period of time sufficient to raise its solution viscosity by after-condensation to a value of about 1.6 to 3.0.

It is emphasized that the coherent bed or pourable layer of granular material (as defined in the journal "Chemie-Ingenieur-Technik," vol. 24, 1952, No. 2, pages 58 to 59) moves only by reason of the force of gravity through a vertical vessel having a substantially uniform cross-section over a sufficient height to provide stabilized flow and is not subjected to fluidizing conditions. In other words, the granulate runs slowly from top to bottom through the reaction apparatus in a partially dammed state, i.e. by regulated discharge through a narrowing discharge zone or outlet at the bottom of the apparatus. In the process of the invention, the coherent bed is permeated uniformly by an inert gas flowing countercurrently upwardly, the gas velocity lying sufficiently below the turbulence point so that the granulate particles always remain in contact with each other. The granulated material thus moves or slides downwardly exclusively by reason of its own weight.

A stabilized granular bed in bulk form or so-called pourable bulk layer presents in the idealized case a coherent stream flow which assures an equal residence time of all the particles passing through the reaction apparatus.

The terms "stabilized flow" or "coherent flow" are intended herein to designate a flow in which the velocity of the particles in all or substantially all vertical lines of flow is constant over the cross-section of the holding vessel. Especially suitable apparatus capable of being used for the process of the invention, especially for handling a relatively large throughput of granular material, is disclosed in detail in the copending and commonly assigned U.S. patent appliction, Ser. No. 814,625 filed Apr. 9, 1969, now Pat. No. 3,544,091 by Friedrich Jaeger and Johannes Holzner, entitled Apparatus for Continuous Thermal Treatment of Pourable Granules, the subject matter of which is incorporated herein by reference as fully as if set forth in its entirety. Such apparatus is essentially characterized as an elongated vertically positioned vessel of rectangular cross-section with feed means for the granular material at its upper end and discharge means at its lower end including a unidimensionally narrowing rectangular discharge zone, constructed and arranged to ensure the stabilized flow of the granular material in a thermal treatment zone. The apparatus may also include an air-tight storage chamber arranged below the discharge zone for further cooling and/or temporary retention of the thermally treated granular material. This apparatus can be easily adapted to the specific process of the present invention, with certain minor modifications being explained in greater detail hereinafter.

Normally, the initial granulate or precondensate is supplied to the apparatus with an average degree of crystallization $\alpha$ of at least about 5%, preferably more than 10% but less than 55%. Preferably the average degree of crystallization $\alpha$ of the initial precondensate lies between about 30% and 50%, because the danger of agglomerization or particle adhesion during the after-condensation is thereby considerably reduced, surprisingly even in the range above 235° C.

Amorphous or only slightly crystalline polyester granulate can be brought to a degree of crystallization falling within the indicated preferred limits either in a separate apparatus, for example, in a discontinuously operated tumble dryer or else in a continuously operated crystallization zone arranged to feed into the top of the heating zone of the apparatus employed for the thermal treatment of the invention.

Surprisingly, the process of the present invention overcomes the previously held prejudice arising because of the difficulties encountered when conducting a continuous after-condensation in a static bed which is moved neither mechanically nor aerodynamically. At the same time, the use of a coherent granular bed moved in bulk form solely by gravity avoids the serious problems caused by vigorous agitation.

In carrying out the process of the invention, it is of course helpful to heat all of the granulate or particles as uniformly as possible. By stabilizing the flow of the individual particles in such a way that their velocity is constant across any given cross-section of the heating zone, all of the particles will have an approximately equal residence time within individual treatment zones or layers. With the narrowing of the range or spectrum of the residence time due to the flow stabilization of the granular bed, the properties of the individual particles of polyester are obviously strongly homogenized, especially their solution viscosity. It was surprising, moreover, to discover that in the stabilized flow of the granular bed, the tendency of the polyester to agglomerate is so low that temperatures up to 325° C. can be used without disturbances caused by increasing particle size or adherence to the apparatus.

The solution viscosity "S.V." is defined by the equation: $S.V. = t/t_0$ wherein $t$ is the period of time required for flow through a viscosimeter of a solution of the polyester in a solvent, using 10 grams of polyester per liter of the solution. The pure solvent is a mixture of 10 parts by weight of phenol and 7 parts by weight of 2,4,6-trichlorophenol, at 25° C. The denominator $t_o$ is the corresponding flow time of the pure solvent, also measured at 25° C. Actual measurements are carried out with a polyester solution which contains 250 mg. of polyester in 25 ml. solution, through an "Ubbelohde" viscosimeter at 25° C.

By the "average degree of crystallization $\alpha$," there is meant an average value which results from individual measurements of the degree of crystallization of a significant number of granule samples.

The process of the invention can be carried out with an extremely simple and inexpensive apparatus in only one stage, i.e., a single flow of inert gas is introduced into the vertically positioned apparatus in the vicinity of the discharge of the granular bed and is drawn off from the apparatus in the vicinity of the granulate feed. The length of the heating zone in the apparatus, i.e., the residence time of the granulated polyester, is generally determined by the essential properties of the material, such as initial solution viscosity, initial crystallinity and particle size, as well as by the temperature of the inert gas and/or any supplemental heating required to achieve the desired final solution viscosity.

Although a number of these properties or conditions are defined within certain limits, it will be recognized that the size of the apparatus, the rate of discharge of the granular bed and the method of heating can be varied within relatively wide limits, the required parameters being relatively easy to calculate based upon a material and energy balance and/or by a few routine preliminary tests. Although the heating zone of the apparatus is operated under non-isothermal conditions, it is essential for the granular material to heat up to the prescribed maximum value of 210–240° C., preferably 220–235° C., preferably within about the upper one-half to one-third of the heating zone. Part of the heat supplied to the granular material arises from the liberation of the heat of crystallization as explained below.

It is also an important feature of the present invention that the maximum temperature required for the heating medium is not higher but preferably lower than the specified maximum temperature of the polyester granules which are being after-condensed. The heating medium may consist solely of the inert gas to provide direct heat exchange with the granular polyester or it may be a combination of indirect jacket heating and the use of an inert gas in order to improve the heat transfer and the homogenization of the polymer properties. In either case, the temperature of the fluid heating medium can be regulated at a temperature somewhat below the maximum temperature required for the granular material because the granular material itself provides an additional increase in temperature by release of the heat of crystallization.

A particularly preferred method of carrying out the process of the invention involves working in two stages. These two stages are essentially formed by introducing a first hot inert gas stream into the upper portion of the vertical heating zone and a second relatively cooler inert gas stream into the lower portion of the vertical heating zone, such that said first inert gas stream flows countercurrently to the freshly introduced granular material in a thermally superstoichiometric amount sufficient to bring the granular material to a temperature of less than about 3° C. below the entry temperature of said first inert gas stream within a period of about 0.1 to 5 hours and to bring the temperature of the granular material at the point of entry of said first inert gas stream up to about 1° C. to 10° C. below the maximum temperature required for said after-condensation, and such that said second inert gas stream flows countercurrently to the granular material below the point of entry of said first inert gas stream in a thermally sub-stoichiometric amount whereby the temperature of said granular material is raised by about 1° C. to 10° C. to its maximum temperature through liberation of its heat of crystallization.

It has thus been established that in the course of this two stage thermal treatment of the granulated polyester there can be distinguished essentially two zones: a primary heating zone in which the temperature of the granulate is relatively quickly brought up within the immediate vicinity of the maximum granulate temperature without it being necessary for any substantial after-condensation to take place and an after-condensation or secondary heating zone in which the most essential or major proportion of the after-condensation takes place. It was possible to perceive a dependency of the degree of crystallization upon the heating time or residence time in the heating zone and the speed of after-condensation. In order to maintain the primary heating time within the desired limits, it is expedient to provide a bounded heating zone, i.e. a supplemental heating jacket.

The two-stage process of the invention is thus characterized in that in the first stage (corresponding to the primary heating zone) and in the second stage (corresponding to the secondary or after-condensation zone), the granular bed is conducted in countercurrent flow to different inert gas streams. This type of individual gas streams of the process involves certain decisive advantages. Thus, in the first stage or so-called primary heating stage, large amounts of the inert heating gas are needed in order to achieve a relatively rapid heating of the initial granulated polyester and also to make possible the liberation of relatively large amounts of the heat of crystallization within a short period of time. In the second stage, the so-called secondary heating or after-condensation stage, the inert gas serves mainly to carry along the resultant gaseous reaction products; in this case, however, very high demands are placed on the purity of the inert gas in the after-condensation stage. On entry into this after-condensation stage, the inert gas should be so pure that the sum of the partial pressures of the non-inert constituents is less than 2 mm. Hg, and it is preferable to achieve a value of even less than 1 mm. Hg.

While in the single-stage process the demands for both a "large" and a "pure" supply are placed on the entire flow of inert gas, this problem can be avoided in the two-stage process. Thus, it is possible to use two different gas streams, namely a larger and relatively less pure gas stream in the first stage and a small, very pure gas stream in the second stage. The resulting advantages in energy are further explained hereinafter.

When the process is carried out in two stages, it is necessary to conduct countercurrently to the granular material in the first stage a thermally super-stoichiometric amount of hot inert gas stream. In the second stage there can be introduced a thermally sub-stoichiometric amount of a cold or relatively cool inert gas stream.

By a "thermally stoichiometric amount" of gas (in reference to its heat capacity), there is meant an amount of gas at which the product of gas throughput per hour and the specific heat of the gas $(m \cdot C_p)_{Gas}$ is equal to the product of granulate throughput per hour and the specific heat of the granulate $(m \cdot C_p)_{Granulate}$. In a thermally sub-stoichiometric gas stream, the product $$(m \cdot C_p)_{Gas}$$

is thus smaller than the product $(m \cdot C_p)_{Granulate}$. A thermally super-stoichiometric gas stream occurs when $$(m \cdot C_p)_{Gas}$$

is greater than $(m \cdot C_p)_{Granulate}$.

In a preferred form of the process of the invention, the thermal treatment of the granulate is carried out in two stages, in which there is conducted countercurrently to the granular material in the first stage a thermally super-stoichiometric hot inert gas stream and in the second stage a thermally sub-stoichiometric cold inert gas stream, the heating of the granulate to temperatures of less than 3° C. below the entry temperature of the hot inert gas stream being carried out within 0.1 to 5 hours, preferably from 0.1 to 1.0 hours in the first stage. In the second stage, the granular material undergoes a self-induced raising of the temperature from 1° C. to 10° C. below its temperature maximum up to its required temperature maximum by reason of the liberated heat of crystallization.

The initial or primary heating time in the first stage determines the crystallinity of the polyester upon entry into the second or after-condensation stage of the heating zone. The crystallinity should not be too high, because otherwise there exists the danger of an excessively low after-condensation velocity and the proportion of the heat of crystallization still available for the final heating of the granulate in the second stage can be lost. To this extent, then, there is also a connection between the primary heating time in the first stage and the time required in the second stage to fully achieve the desired final solution viscosity. It is therefore recommended that the primary heating time in the first stage be kept within a period of at most 5 hours.

The theoretical minimum value for the heating time in the first stage is actually considerably lower than 0.1 hours and can be thermodynamically determined. However, the indicated minimum value of 0.1 hours guarantees an adequately uniform heating of all the individual particles present in the granular layer while passing through the first stage.

Since the heat liberated during the crystallization lies on the order of magnitude of several kilocalories per kilogram of the initial polyester granules, even with precrystallization, there is achieved a substantial gain in energy sufficient to bring the temperature of the granules up to their maximum temperature, e.g. so as to provide as much as a 10° C. increase in their temperature after entering the second or after-condensation stage.

As inert gas there can be used any of the indifferent or non-reacting gases known to those skilled in this art, as for example, nitrogen, carbon dioxide, helium and the like. Nitrogen is of course especially preferred because of its availability and relatively low cost.

In order to achieve the primary heating of the precrystallized granulate within the prescribed time of 0.1 to 5 hours, there are preferably conducted countercurrently in the first stage at least 2 cubic meters (S.T.P.) of nitrogen per kilogram of the precrystallized granulate. The amounts or volumes of nitrogen used are limited as a maximum by the turbulence point. This means that the amount of nitrogen conducted countercurrently upwardly through the granular bed must not be greater than that amount which brings about such an extensive loosening up or fluidizing of the bed or layer that the particles no longer contact each other. Generally, the amount of gas needed for such fluidization (fluidization point) is partly dependent on the shape and size of the granulate as well as on the type of polyester being treated and the inert gas itself.

In the second stage the ratio $$(m \cdot C_p)_{Gas} : (m \cdot C_p)_{Granulate}$$

preferably lies between about 0.1 and 0.7. In this range the energy utilization is especially favorable.

It is recommended that the inert gas be recycled for reasons of economy in energy as well as for reasons of saving fresh gas, both in the single-stage and also in the two-stage process. Thus, it is possible to withdraw or recover the inert gas after passing through the apparatus so as to be regenerated between emergence from the heating zone of the apparatus and before its recycle and reentry into the apparatus.

If the process is carried out in two stages, the inert gas streams conducted in counterflow to the granular material in the first and in the second stage can both be recycled, but only the inert gas required in the second stage needs to be completely regenerated, since it is only in the second stage that the requirement for a very pure inert gas must be fulfilled. At the same time, however, the inert gas needed in the second stage makes up quantitatively only a relatively small portion of the entire inert gas stream.

The inert gas needed in the second stage can thus be branched off from the entire gas leaving the first stage before its regeneration, and the regenerated gas then is passed upwardly in the second stage to again combine with the remaining inert gas introduced in the first stage. Thus, both the first and second stage gas streams are preferably drawn off together from the top of the heating zone while regenerating only that partial stream recycled to the second stage. The operation with such a partial stream leads to a further improvement of the process by reducing the required costs in energy and apparatus.

The regeneration of the effluent inert gas from the heating zone can be carried out in a known manner. Preferably, however, the inert gas supplied for regeneration is cooled and washed with water, reacted with a sufficient amount of hydrogen to reduce or remove its oxygen content, and is then dried in a silica gel bed. The cooling and washing of the inert gas can be accomplished, for example, by conducting the inert gas in a tube or tower in counterflow to a falling stream of water. The reduction of the oxygen content with hydrogen takes place in a conventional deoxo apparatus.

In the case of nitrogen, it has been found sufficient to regenerate the gas to a dew point corresponding to 100 p.p.m. $H_2O$.

Finally, it has been established that the danger of agglomeration in the after-condensation stage or zone of the apparatus can be further diminished if the granulate, during its discharge from the apparatus and preferably before leaving the second stage, is rapidly cooled to a temperature below about 150° C. By providing such a cooling zone, there is achieved a certain shock effect on the granular material so that particles which may still tend to adhere together jump apart by reason of the sudden drop in temperature.

The following examples taken in conjunction with the accompanying drawings provide an illustration of various embodiments of the inventive process in the thermal treatment of polyethylene terephthalate.

The process of the invention can be used for other predominantly linear polyesters and/or fiber-forming polyesters by analogously modifying the given data, i.e. temperatures, degrees of crystallization, solution viscosities, etc. It simply is not feasible to include all such data for every known linear or fiber-forming polyester or various modifications thereof but this does not alter the basic equivalency between individual polyesters for purposes of the present invention or their suitability within the spirit and scope of the appended claims.

For a brief explanation of the drawings:

FIG. 1 provides a graph for the conversion of the average density $\rho$ into the corresponding average degree of crystallization $\alpha$, with reference to the polyethylene terephthalate granules used in all of the working examples;

FIG. 2 is a schematic flow sheet of a relatively simple single stage apparatus of circular cross-section for thermal treatment of the polyethylene terephthalate without recirculation of the inert gas stream;

FIG. 3 is a schematic flow sheet of another single stage apparatus corresponding to that shown in FIG. 2 but having larger dimensions and being provided with a heating jacket;

FIG. 4 is a schematic flow sheet of still another vertical apparatus of circular cross-section and having a heating jacket as in FIG. 3, but also with means to establish two stages and a recirculation and partial regeneration of the inert gas; and FIG. 5 is a schematic flow sheet of an especially preferred two-stage apparatus of rectangular cross-section, with individual portions of the processing and recirculating system shown in somewhat greater detail.

FIGS. 2–5 are to be considered in conjunction with the various examples, it being understood that individual temperatures or other conditions may vary even though the physical arrangement of the apparatus remains the same.

EXAMPLE 1

Polyethylene terephthalate cuttings or granules are first precrystallized in a conventional tumbler drier to a mean density of 1.377 g./cm.$^3$, the granules having a solution viscosity S.V.=1.83 and a particle size of 2 x 3 x 4 mm.$^3$. These precrystallized granules are continuously filled at the top into a vertical tube reactor of 80 mm. in diameter and 800 mm. in length as shown in FIG. 2. They run through the reactor as a bulk layer or coherent bed, moving only by gravity and being discharged at the bottom of the reactor. With a granule throughput of 0.35 kg./hr., there results a residence time of the particles in the tube reactor of about 8 hours. At the end of the upper third of the tube reactor there is a temperature sensor to measure the maximum temperature of the granular bed. Countercurrent to the downward movement of the bed, there are conducted about 5 m.$^3$ (S.T.P.) of preheated nitrogen per hour. The heating of the nitrogen is regulated in such a way that in the steady state there is registered at the temperature sensor at the end of the upper third of the reactor a temperature of 230° C. which corresponds to the maximum temperature. The solution viscosity of the granular product as achieved by the after-condensation amounts to S.V.=2.45.

EXAMPLE 2

In a tube reactor as described under Example 1 and illustrated in FIG. 2, there is established a continuous throughput of 0.35 kg./hr. of polyethylene terephthalate granules having a solution viscosity S.V.=1.80 and precrystallized to a density between 1.37 g./cm.$^3$ and 1.38 g./cm.$^3$. The granules in this case have a cylindrical shape with a diameter of 1.1 mm. and a length of 2.5 mm. During a residence time of approximately 8 hours, there is conducted countercurrently to the cuttings 1 m.$^3$ (S.T.P.) per hour of preheated nitrogen, the heating of the nitrogen being controlled such that at the temperature measuring point at the end of the upper third of the apparatus there is registered a steady temperature of 225° C. The solution viscosity of the after-condensed granular product amounts to S.V.=2.17.

EXAMPLE 3

In a tube reactor with a diameter of 200 mm. and a cylindrical length of 2000 mm. as shown in FIG. 3, the reactor being heated by means of an annular heating jacket and being fitted on the lower end with a slightly conical discharge outlet, there are continuously after-condensed 3.3 kg./hr. of a polyethylene terephthalate granulate which has been precrystallized to an average density of 1.381 g./cm.$^3$, and initially exhibits a solution viscosity of S.V.=1.77 and a particle size of 2 x 3 x 4 mm.$^3$. With a retention time of approximately 12 hours, there are conducted countercurrently to the granular bed, which moves downwardly solely by reason of the force of gravity, 4 kg./hr. of nitrogen at room temperature. With a jacket temperature of 222° C. there occurs at about half the height of the reactor a maximum temperature of 227° C., which above the discharge cone, i.e. shortly above the entry of the cold nitrogen stream, there is measured a temperature of 200° C. to 215° C. The solution viscosity of the granular material rises in the course of the after-condensation to a final value of S.V.=2.30.

EXAMPLE 4

In a tube reactor of the same type described under Example 3, there is directed countercurrently to the continuous granular flow in a short upper portion of the heating zone a first hot inert gas stream, conducted in relatively large amounts with recirculation and heating, while at the lower end of the reactor there is introduced a relatively smaller amount of a second inert gas stream in counterflow, regenerated over a cooling tower and a silica gel bed and likewise recirculated, all as indicated in FIG. 4. The polyethylene terephthalate granules of a particle size of 2 x 3 x 4 mm.$^3$ are fed into the top of the reactor at a density of 1.138 g./cm.$^3$ and a solution viscosity of S.V.=1.78. The throughput of the granulate amounts to 2.5 kg./hr. The second nitrogen stream of approximately room temperature is fed at the bottom at a rate of 2.9 kg./hr. The heating of the upper, considerably larger nitrogen stream is regulated in such a way that at the lower end of the primary heating zone in the reactor just above the hot nitrogen inlet, a temperature of 228° C. is established. At the lower end of the middle third of the reactor, there is measured a maximum temperature of 236° C. Shortly above the introduction point of the cold nitrogen, the temperature is about 180° C. to 200° C. With a residence time of the granular material in the hot portion of the reactor of approximately 16 hours, the solution viscosity of the granulate rises to S.V.=2.45.

EXAMPLE 5

To a reactor and apparatus as described under Example 4 and illustrated in FIG. 4, there are continuously supplied 7 kg./hr. of polyethylene terephthalate granulate of a particle size of 1.7 x 2.8 x 3.5 mm.$^3$, an average density of 1.382 g./cm.$^3$ and a solution viscosity of S.V.=1.55. The heating of the upper inert gas circulation is regulated in such a way that at the lower end of the first stage or primary heating zone there occurs a temperature of 220° C. With a jacket temperature of 221° C. to 222° C., a maximum temperature of 225° C. is established at the lower end of the middle third of the reactor. Shortly above the introduction point of about 4.8 kg./hr. of cold nitrogen (room temperature), there is measured a temperature of 224° C. With a residence time of approximately 5.75 hours, the solution viscosity rises to S.V.=1.83.

EXAMPLE 6

To a reactor as described in Example 4 and shown in FIG. 4, there are continuously supplied 2.8 kg./hr. of a polyethylene terephthalate granulate of a particle size of 1.7 x 3 x 4 mm.$^3$. By regulation of the heating of the upper inert gas stream the temperature at the lower end of the primary heating zone is adjusted to 220° C. With a jacket heating temperature of 222° C., a temperature of 225° C. is established at the lower end of the middle third of the reactor. Above the introduction point for 2.9 kg./hr. of cold nitrogen (room temperature), there are measured temperatures between 205° C. and 220° C. With a residence time of the granular material of approximately 14 hours, the solution viscosity increases to S.V.=2.19.

EXAMPLE 7

In a reaction vessel as illustrated in FIG. 5 with a rectangular cross-section of 500 x 500 mm.$^2$ and a non-obstructed height of 3000 mm. with an after-engaged stabilization zone and a pre-engaged heating zone of about 500 mm. in height, there are continuously after-condensed 26 kg. per hour of polyethylene terephthalate granulate having a solution viscosity of S.V.=1.77 and a particle size of 2 x 3 x 4 mm.$^3$, precrystallized to a density of 1.385 g./cm.$^3$. The after-condensation is carried out in two stages in the granular bed moving downward through the rectangular reactor only by gravity. In the first stage or primary heating zone at the top of the reactor, there is conducted countercurrently to the granular bed a hot, unregenerated or relatively impure inert gas of 230° C., while in the second heating stage or after-condensation zone proper, there is introduced a pure or regenerated inert gas at room temperature. In the heated recycle system for the first stage, there are circulated 420 m.³ (S.T.P.) per hour of inert gas without regeneration, while in the second stage or after-condensation zone there are conducted 15 m.³/hr. of pure, regenerated nitrogen in counterflow to the granular bed. The granulate remains in the after-condensation stage, in which it achieves a maximum temperature of approximately 233° C., for about 20 hours. The solution viscosity is raised by the after-condensation to S.V.=2.65.

The regeneration of the hot nitrogen stream removed at the top of the rectangular reactor is clearly illustrated in FIG. 5. The bulk of the impure nitrogen is first branched off and passed through a heater for supplemental heating and then returned to the first stage. The smaller amount of nitrogen is then directed in sequence through a cooling tower where it is washed with water, through a deoxygenator where its oxygen content is removed by reaction with hydrogen and then through a suitable drying apparatus such as the silica gel bed to substantially reduce the water content. The regenerated or pure nitrogen is then returned at the bottom or in the discharge zone of the rectangular reactor. A second discharge zone or optional air-tight retention chamber can be provided at the bottom of the reactor, and a small amount of the recycled pure nitrogen can be introduced into this chamber as indicated by the broken flow line to further cool the granulate. Discharge drums, preferably in combination with a gate or door on the discharge slot of the rectangular reactor and its optional retention chamber, provide a means of regulating the gradual discharge of the granular material. Finally, the thermally treated and cooled granulate is carried away by a suitable conveyor belt. This same apparatus is employed in all of the following examples.

EXAMPLE 8

To the same apparatus as described under Example 7 there are supplied hourly about 420 m.³ (S.T.P.) of nitrogen in heated circulation to the first stage at a temperature of 225° C. and 12 m.³/hr. of pure, unheated nitrogen to the second or after-condensation stage. With a granulate throughput of 21 kg./hr., the residence time in the after-condensation zone amounts to about 24 hours with a maximum temperature of 229° C. The solution viscosity increases through the after-condensation from S.V.=1.77 to S.V.=2.52.

EXAMPLE 9

Again, using the apparatus as described under Example 7 there are supplied to the first stage 420 m.³ (S.T.P.) per hour of nitrogen at 216° C., conducted in the heated recycle stream. To the second or after-condensation stage, there are fed 33 m.³/hr. (S.T.P.) of pure nitrogen at room temperature. There is a throughput of 104 kg./hr. of the polyethylene terephthalate granulate having a particle size of 4 x 4 x 2.5 mm.³, the granulate having been precrystallized to an average density of 1.383 g./cm.³. In the second or after-condensation stage, the granulate temperature rises to a maximum of 222° C. During a residence time of approximately 4.8 hours, the solution viscosity increases from S.V.=1.62 to S.V.=1.81.

EXAMPLE 10

In the reaction apparatus described under Example 7 and shown in FIG. 5, there are supplied to the first stage or primary heating zone 420 m.³/hr. (S.T.P.) of nitrogen heated to 219° C· and conducted in the heated recycle system. To the second stage or after-condensation zone, there are supplied 30 m·³/hr. (S.T.P.) of pure nitrogen at room temperature. There is a downward throughput in the reactor of 80 kg./hr. of polyethylene terephthalate granulate having a particle size of 2 x 3 x 4 mm.³, a solution viscosity of S.V.=1.77 and an average density of 1.385 g./cm.³.

In the after-condensation stage, the granulate temperature rises to a maximum of 225° C. The solution viscosity increases, with a residence time of approximately 6 hours, to S.V.=2.04.

EXAMPLE 11

In the reaction apparatus set forth in FIG. 5 and described under Example 7, there are fed to the first stage or primary heating zone 420 m.³ (S.T.P.) per hour of nitrogen heated to 219° C. from the recycle system. From this heated recycle system, there are withdrawn 25 m.³ (S.T.P.) per hour of nitrogen, which is conducted through the washing and cooling tower and also through the deoxygenator and a silica gel bed. Then, with a dew point corresponding to less than 100 p.p.m. H₂O, the purified nitrogen is supplied to the after-condensation stage. 78 kg./hr. throughput of polyethylene terephthalate granulate of the same properties described under Example 10 achieve during a residence time of 6 hours in the after-condensation zone a maximum temperature of 224° C. The solution viscosity increases to S.V.=2.04 in the final product.

EXAMPLE 12

In a reaction apparatus as described under Example 7 and shown in FIG. 5, there are supplied to the first heating stage 420 m.³/hr. (S.T.P.) of nitrogen at 227° C. from the heated recycle. From this heated recycle to the first stage, there are withdrawn 25 m.³ (S.T.P.) per hour of nitrogen, regenerated as in Example 11 and supplied to the after-condensaton zone at the bottom of the reactor. 126 kg./hr. of polyethylene terephthalate granulate of the same properties described in Example 10, with a residence time of approximately 4 hours, reaches a maximum temperature of 231° C. in the second stage and is after-condensed to a solution viscosity of S.V.=2.06 in the final product.

In all of the foregoing examples, the abbreviation "S.T.P." is used to indicate the fact that the specified volume of gas is measured at normal or standard temperature and pressure, i.e. room temperature and one atmosphere. It is a particular advantage of the invention that the thermal treatment of the granulate can be carried out without requiring the use of a vacuum and without a high pressure system. A slightly elevated pressure in the apparatus is helpful to exclude atmospheric oxygen from the system, and a small part of the nitrogen or other inert gas can be bled off from the heated recycle system of the first stage with fresh nitrogen added. Such partial removal of impure nitrogen and replacement with pure nitrogen may also be desirable in those instances where the impurities collect more rapidly than can be removed in the second portion of the recycle system.

Other modifications can be readily made in the process, provided that they do not tend to interfere with the coherent gravity-flow of the granular bed during its thermal treatment. For example, with a sufficiently high vertical reactor of uniform cross-section, it will be recognized that the thermal treatment or after-condensation can be substantially completed in a second stage or after-condensation zone corresponding to a layer or cross-section of the reactor which is relatively higher from the bottom or discharge zone of the reactor. This not only ensures stabilized flow in the second stage but also permits a relatively stronger cooling in the discharge zone, e.g. by adding a cooling jacket if desired.

Most importantly, by using a stabilized gravity-flow granular bed, there is very little or no abrasion of the granules against each other or against the structure of the apparatus so that long periods of operation do not show any tendency toward agglomeration or adhesion of the individual particles. Also, especially when using the two-stage system, substantial economies are realized in the energy requirements of the process while also avoiding excessive cost of apparatus.

We claim:

1. Process for increasing the molecular weight of a polyethylene terephthalate precondensate by thermal treatment in the solid phase which comprises:

continuously conducting said precondensate as a pourable granular material having an initial average degree of crystallization of at least about 5%, a substantially uniform particle size and an initial solution viscosity of about 1.4 to 2.3 downwardly solely by the force of gravity through an elongated vertical heating zone of uniform cross-section to form a coherent granular bed with stabilized flow and approximately uniform retention time of the individual particles in said heating zone;

passing an inert gas upwardly in countercurrent flow through said granular material in said heating zone at a rate insufficient to cause fluidization of the granular bed; and heating said granular material within said heating zone up to the maximum temperature required for further condensation of about 210° C. to 240° C. and for a period of time sufficient to raise its solution viscosity to about 1.6 to 3.0 by after-condensation, at least a portion of the heat required to achieve said maximum temperature being provided by heat of crystallization liberated from said pourable granular material flowing through the heating zone.

2. A process as claimed in claim 1 wherein the initial precondensate has an average degree of crystallization of between about 30% and 50%.

3. A process as claimed in claim 1 wherein said inert gas is recovered from said heating zone, regenerated and recycled for said countercurrent flow.

4. A process as claimed in claim 1 wherein said maximum temperature is between about 220° C. and 235° C.

5. A process as claimed in claim 1 wherein the thermal treatment of the granular material is carried out in two stages formed by introducing a first hot inert gas stream into the upper portion of the vertical heating zone and a second relatively cooler inert gas stream into the lower portion of the vertical heating zone, such that said first inert gas stream flows countercurrently to the freshly introduced granular material in a thermally super-stoichiometric amount sufficient to bring the granular material to a temperature of less than about 3° C. below the entry temperature of said first inert gas stream within a period of about 0.1 to 5 hours and to bring the temperature of the granular material at the point of entry of said first inert gas stream up to about 1° C to 10° C. below the maximum temperature required for said after-condensation, and such that said second inert gas stream flows countercurrently to the granular material below the point of entry of said first inert gas stream in a thermally sub-stoichiometric amount whereby the temperature of said granular material is raised by about 1° C. to 10° C. to its maximum temperature through liberation of its heat of crystallization, both of said gas streams being conducted through each zone of the granular bed at a rate insufficient to cause fluidization of the bed.

6. A process as claimed in claim 5 wherein the initial precondensate has an average degree of crystallization of between about 30% and 50%.

7. A process as claimed in claim 5 wherein said maximum temperature is between about 220° C. and 235° C.

8. A process as claimed in claim 5 wherein the inert gas is nitrogen.

9. A process as claimed in claim 8 wherein said nitrogen is conducted countercurrently to the granular material in the first stage corresponding to the upper portion of said heating zone in an amount of at least 2 cubic meters, measured at standard temperature and pressure, per kilogram of the granulate.

10. A process as claimed in claim 8 wherein said second inert gas stream of nitrogen is conducted countercurrently to the granular material in the second stage corresponding to the lower portion of said heating zone such that the ratio $(m \cdot C_p)_{Gas} : (m \cdot C_p)_{Granulate}$ lies between about 0.1 and 0.7.

11. A process as claimed in claim 5 wherein said inert gas is recovered from the top of said heating zone and recycled for said countercurrent flow after regenerating at least a portion thereof.

12. A process as claimed in claim 11 wherein only that portion of the recovered inert gas recycled to the lower portion of said heating zone is regenerated.

13. A process as claimed in claim 11 wherein said inert gas is regenerated by cooling with water, reacting it with hydrogen to reduce its oxygen content and drying it in a silica gel bed.

14. A process as claimed in claim 5 wherein the after-condensed granulate, as it is discharged from the lower portion of said heating zone, is rapidly cooled to a temperature below about 150° C.

15. A process as claimed in claim 14 wherein a cold inert gas is introduced below said heating zone to effect said rapid cooling.

References Cited
UNITED STATES PATENTS

| | | | |
|---|---|---|---|
| 3,014,011 | 12/1961 | Zoetbrood | 260—75 |
| 3,305,532 | 2/1967 | Middleburg et al. | 260—75 |
| 3,405,098 | 10/1968 | Heighton et al. | 260—75 |

FOREIGN PATENTS

| | | |
|---|---|---|
| 993,121 | 5/1965 | Great Britain. |

OTHER REFERENCES

Hsu, J.Macromol. Sci.—Phys., B1(4), 801–13 (1967).

MELVIN GOLDSTEIN, Primary Examiner

U.S. Cl. X.R.

260—75 T

UNITED STATES PATENT OFFICE
CERTIFICATE OF CORRECTION

PATENT NO. : 3,756,990
DATED : September 4, 1973
INVENTOR(S) : JAEGER et al

It is certified that error appears in the above-identified patent and that said Letters Patent are hereby corrected as shown below:

In Column 1, Line 44, delete "140" and substitute --144--

In Column 2, Line 8, delete "mechanical" and substitute --mechanically--

In Column 3, Line 28, delete "articles" and substitute --particles--

In Column 4, Line 67, delete "325°C." and substitute --235°C.--

Signed and Sealed this

Tenth Day of August 1976

[SEAL]

Attest:

RUTH C. MASON
Attesting Officer

C. MARSHALL DANN
Commissioner of Patents and Trademarks